Aug. 2, 1949.  H. W. COLLINS  2,478,165
LOW-PRESSURE MOLDING APPARATUS
Filed May 24, 1946
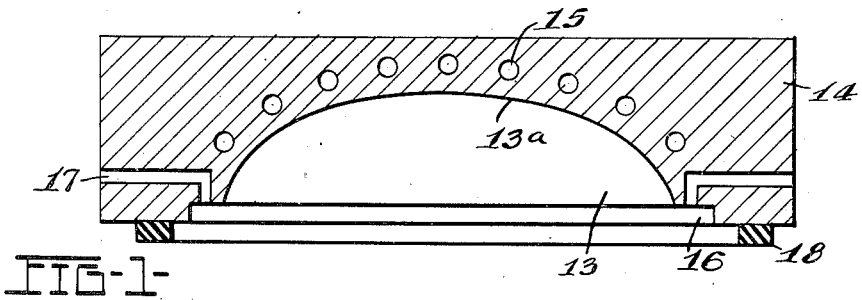
FIG-1-
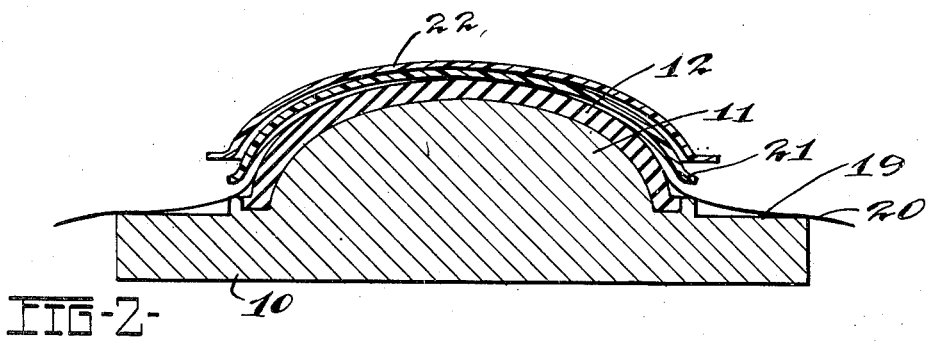
FIG-2-
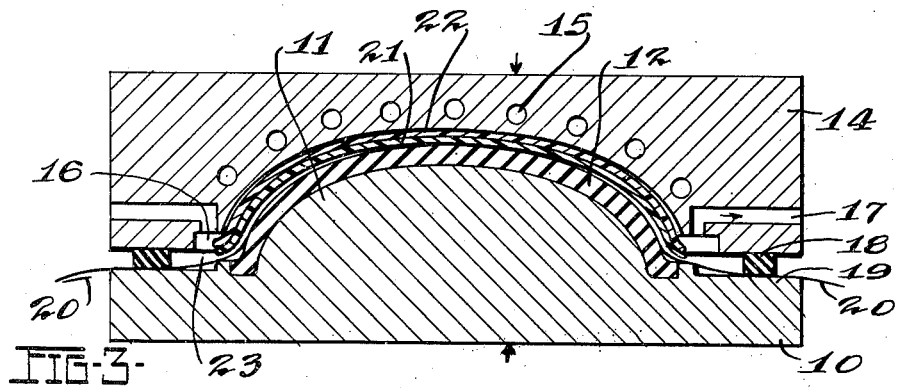
FIG-3-
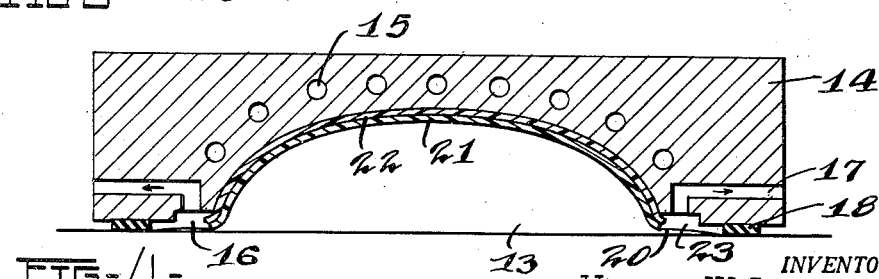
FIG-4-
INVENTOR.
HOWARD W COLLINS
BY
Staelin & Overman
ATTORNEYS Patented Aug. 2, 1949

2,478,165

UNITED STATES PATENT OFFICE 2,478,165

LOW-PRESSURE MOLDING APPARATUS

Howard W. Collins, Newark, Ohio, assignor to Owens-Corning Fiberglas Corporation, a corporation of Delaware Application May 24, 1946, Serial No. 671,970

1 Claim. (Cl. 18—19)

This invention relates to the molding of plastics and particularly to the molding and laminating of reinforced resinous materials at relatively low pressures.

The recently developed low pressure molding technique makes possible the economical fabrication of large items from fibrous filled resinous materials having poor flow qualities. By this is meant the manufacture of large reinforced structural items, such as automobile tops, doors, trunks, household sinks, tubs, panels, boat hulls, airplane fuselages, wings, tails, bread baking pans or the like.

In contrast with the high pressure molding technique, the low molding pressures of ¼ pounds per square inch to 250 pounds per square inch enable the use of molds of readily formable low-cost materials. Such materials include wood, cast metals, reinforced sheet metal stampings, plaster of paris, or built-up paper forms. Obviously, such materials may be assembled to comprise a mold form which is substantially unlimited in size and which might be subsequently altered when a design is changed, without greatly increasing the mold cost.

There are many additional advantages attributable to plastics formed by the low pressure technique. Among these is the ease by which the strength may be selectively varied merely by the disposition of long fibers in a predetermined general direction. This is particularly evident in the use of glass fibers for reinforcing a resinous binder. If a uni-direction warp is used having the glass fibers disposed in only one direction, maximum tensile strengths are developed in that direction, whereas, an overall glass fiber fabric will produce high strengths in both the longitudinal and transverse directions. Inserts, or reinforcing strips, may be readily positioned with the molding composition subsequently to form an integral part of the molded article. Undercuts or thin sections may comprise a part of the molded article without loss of strength. These are features which are difficult to obtain when molding is carried on by high pressure techniques.

One commonly used low pressure molding process, generally referred to as the blanket method, consists in the disposition of reinforcing fabric plies or fibrous preforms on a mold form and completely impregnating the fibrous materials with a liquid resinous binder. Subsequently, a co-acting member, which may take the form of a flexible rubber blanket, is brought into contact with the exposed surface of the moldable materials. Ordinarily, the rubber blanket is tucked in to form a pressure seal and the air is exhausted from between the blanket and the mold, urging the flexible blanket and the moldable material to conform to the contour of the mold form. The composite structure is then moved into an autoclave or heating oven where additional, externally operating fluid or air pressures may be applied, and heat is therein also supplied for the conversion of the resinous binder from the liquid to a hard insoluble and infusible mass, binding the fillers into a composite molded article.

Many factors inhibit the ready adoption of the low pressure molding technique as a preferred molding method. It is readily understood by those acquainted with the plastic art that the conversion reaction of the thermosetting resinous binder is initiated in response to the elevation of the resin temperature. Since the resinous materials and their fillers are poor heat conductors, the reaction commences at the surfaces first exposed to the elevated temperatures and progresses slowly inwardly and laterally to the adjacent molding composition. As a result, in the molding process described, the edge portions of the molded articles are rendered insoluble and infusible before the inner portions have completely cured. If, as frequently occurs, volatiles or gases are formed during the curing cycles, those gases are entrapped in the molded article to form voids which impair the strength and appearance of the molded article.

When the forming pressure is comprised solely of the atmospheric forces operating when the space inside of the rubber blanket is exhausted, pressures of 10 to 12 pounds per square inch are ordinarily developed. Not infrequently, if liquid resins are used as the binder, the resins seal off the exhaust port from the remainder of the molding material and prevent the removal of air pockets between the fibers. The resulting imperfect molding, having large and numerous air pockets, is unfit for use and further increases the waste and cost of the molded articles.

Wide acceptance of the low pressure molding technique as a plastics fabrication method is further retarded by the difficulties of adaptation to a mass production method of assembly. A continuous molding cycle, which, when attained, should greatly reduce the time and labor which now contribute so markedly to high production costs. Considerable labor and time are now expended in the "laying in" of the resinous coated plies on the mold form, sealing the rubber blanket about the material to be molded in a manner which militates against air leaks and, finally, removing the molded article from the mold form in preparation for another cycle of operation. Throughout the entire cycle, the mold form is tied up in the process and is not available for the pre-assembly thereon of another series of laminates or preforms preparatory to a succeeding curing cycle.

Further limitations reside in the shifting of the blanket during the exhaustion of the confined space, folding the adjacent fabric reinforcements into undesirable wrinkles, which are evident in the finished molded articles. Wrinkles may also be formed during the assembly of the plies, even though care is used in "laying in" the materials, and they are thereafter difficult to iron out.

It is an object of the invention to produce a mold having an automatically sealing flexible membrane that simultaneously operates as a parting compound and the co-acting mold member.

A still further object is to produce a new and improved flexible blanket and separator for use in low pressure molding processes.

Other objects and advantages will hereinafter appear, and for purposes of illustration but not of limitation, an embodiment of the invention is shown on the acompanying drawings, in which Figure 1 is a sectional elevational view of a heated metal mold with a rubber-like sealing gasket;

Figure 2 is a cross-sectional elevational view of the male fixture on which is positioned the separating membrane and the material to be molded;

Figure 3 is a cross-sectional elevational view of the co-acting mold members at a stage of their closing cycle in which mold contact is made but not yet completed; and Figure 4 is an elevational cross-sectional view of the molding material held in contact with the heated mold by the action of atmospheric forces on the flexible membrane.

In the drawings, 10 indicates a mold bracket of wood or the like, having a domed central portion 11 covered with a relatively thick sheet 12 of resilient rubber-like material, of the nature of sponge rubber. Other than the fact that the radial curvature of the domed section 11 is less than the radial curvature of a cavity 13 in the female mold member 14, the domed section substantially conforms to the contour of the cavity 13, which is, in turn, shaped to the contour desired in the finished molded article. The female mold member 14 is heated by means of steam or water channels 15 cored through the body section. An annular groove 16 contiguous to the periphery of the cavity 13 provides a channel from which the air and vapors can be exhausted by means of passages 17 connected with a suitable exhausting system or pump. An annular rubrer-like sealing gasket 18 is attached to the lower surface of the female mold member for purposes of providing a vacuum seal in cooperation with the bracket 10 or any continuous film disposed therebetween.

In operation, a thin film or membrane 20 of a flexible sheet material is placed upon the domed portion 11 of the bracket 10, which for purposes of mounting the material to be molded, is spaced from the heated mold member 14. The thin sheet material forms a continuous impervious flexible film for sealing purposes, and at the same time, a parting compound for separating the mold bracket 10 from the material to be molded. The membrane may consist of any one of a number of pliable resinous materials including regenerated cellulose, pliofilm, polyvinyl alcohol, polyvinyl butyral, synthetic or natural rubber or other nonrigid plastic materials, which are incompatible with the resinous binder of the molding composition. For purposes hereinafter explained, the film 20 is dimensioned in a manner to extend beyond the dome 11 and beyond the gasket 18.

For purposes of illustration, description is made of the fabrication of a molded laminate, it being understood that multiple layers of a preformed fibrous mat having the individual fibers in random distribution, may be used with equal facility as a reinforcement. In this instance, a sheet of textile fabric 21, which may have glass fibers therein for added strength, is disposed or draped upon the film 20 so that it substantially conforms to the contour of the dome 11. The fabric is then saturated with a liquid thermosetting resinous binder. If a solvent solution of a poly-condensation type thermosetting resinous binder is used, a space of time is allowed to elapse, sufficient to evaporate the volatile solvent. Resins of the latter type include the phenol, urea, melamine cresylic acid and resorcinol reaction products with formaldehyde, furfuraldehyde or other aldehydes. For purposes of accelerating the conversion cycle, these materials are ordinarily advanced to a hardened fusible intermediate stage, which, for purposes of impregnation, are dissolved in volatile solvents.

Polymerization type thermosetting resinous binders, liquid in monomeric form enable superposed plies 22 to be immediately positioned over the first coated ply 21. Thus considerable saving in time results, making the latter resins more suitable for the molding technique of the type described. In addition, no reaction products are evolved during the cure, making it easier to produce a more uniform, void-free molded article. Suitable thermosetting polymerizable resins include the polymeric products of allyl alcohols and their derivatives, styrenes having more than one reactive group such as divinyl benzene, modified acrylics, and the polyesters, having sufficient reactive groups enabling the cross linkages found in thermosetting resins.

When the desired number of plies have been mounted on to the male mold bracket 10, the number of plies and the type of fibrous materials depending on the desired strength, the bracket is moved upwardly in the direction of the heated female mold 14. In view of the contour of the dome 11 relative to the cavity 13, the central portion of the outer ply is the first to contact the heated mold surface 13a. The condensation or polymerization reaction commences immediately in response to the increase in temperature of the resinous material. As a result, the conversion reaction commences at the upper central surface and progresses downwardly through the plies by conduction and outwardly along the plies as further contact is made with the heated mold responsive to further increases in contact pressure. Obviously, the resin cures in like order so that the gases evolved during the reaction are first evolved at the upper center portion and then, progressively, from the adjacent portions of the molding composition, the remaining outward and downward portions of the resinous material respectively being in a sufficiently uncured stage to enable the evolved gases to pass freely therethrough and into the atmosphere, thereby producing a substantially void-free molded article.

The progressive squeezing action responsive to the movement of the mold 10 in the direction of the heated mold causes progressive contact between the molding material and mold surface 13a, and operates as an iron, smoothing out the superposed plies 21 and 22 so that the materials are neatly tucked into the mold contour curvatures, substantially eliminating wrinkles and folds.

Before full contact has been made between the mold surface 13a and the molding material, the flexible membrane 20 is adapted to abut the sealing gasket 18 and the underlying bracket shoulder 19. Thereafter, exhaustion of the confined space 23 by means of pumps interconnected by the passages 17 creates vacuum forces holding the flexible membrane against the moldable material, thereafter to operate also as the flexible molding blanket.

The progressive means for contacting the heated mold surface, in which the outer edge portion is the last, militates against the sealing off of the vacuum from inner portions of the molding composition, so that the generated pressures urging the moldable material against the heated mold is effective throughout. Air pockets and undesirable spaced laminations thereby are obviated.

As soon as an effective seal is obtained between the flexible membrance 20 and the sealing gasket, the exhaustion may be continued until a pressure of 10 to 12 pounds is created, which ordinarily is sufficient to compress the molding materials into a composite mass having the contour of the heated mold surface. Since the fixture with the male mold form is no longer needed, it may be withdrawn. This enables mounting of another series of resinous coated plies thereon in preparation for another molding cycle.

In the meantime, the material in contact with the heated mold is being further reacted to the converted stage. The cure may be accelerated by directing heat externally to the exposed underside of the molding material. For this purpose, a heating oven, infra-red lamps or radiant heaters may be used.

When the material has been sufficiently cured, the non-adherent flexible membrane is stripped from the molded article, the heated mold being made again available for engagement with the molding composition mounted on the fixture 19.

It is manifest that a rapid cycle of operations is disclosed particularly adapted for the molding of relatively thin laminated or molded sections. A parting compound similar to that used for the flexible membrane may be used between the surface 13a of the heated mold 14 and the top ply 22 if sticking occurs therebetween.

A cardinal feature of the invention resides in the efficient use of the mold parts. In practicing this invention, the heated mold is continuously in use for curing purposes; the male member being removable therefrom during the curing cycle for the purpose of premounting a new batch of moldable material. Heretofore, in low pressure molding processes, the heated mold has remained idle during the ply mounting process in view of the fact that the male member is not freed for material mounting purposes until the molding cycle has been fully completed.

The flexible membrane 20 automatically provides a vacuum chamber on contact with the sealing gasket 18 and eliminates the time consumed for "tucking in" the present rubber-like blankets in the "hot press" process. The flexible membrane 20 being formed of low cost, thin resinous or rubber-like materials may be discarded after use without materially increasing the cost of the molded product.

I have found that a fabric sheet of interwoven glass fibers coated on one face with a continuous impervious film of rubber-like material, such as natural rubber, vinyl chloride or the like for air sealing purposes, and on the opposite face with a lubricant, such as an organo-silicon oil, for example, polymethyl polysiloxane, forms an improved flexible blanket. The treated glass fiber fabric of the type described may be repeatedly used as a flexible blanket and as a parting membrane without loss of the desirable strength or flexure characteristics. A woven glass fiber fabric is sufficiently deformable to enable the coated fabric to conform to the contour of the mold. In addition, organo-silicon resins and oils preferentially adhere to glass surfaces, thus assuring a complete coating on the glass fibers protecting them from contact with the resinous materials. Since the organi-silicon resins and oils are generally non-adherent to most cured resinous materials, the separation of the silicone-coated glass fibers from the molded article is readily effected.

A blanket of this type is placed with the continuous impervious film away from the surface of the plastic article being molded. The porosity between the glass fibers in the general transverse direction permits entrapped air to be exhausted in the direction parallel with the fabric surface throughout the molding cycle. This property militates against the blocking off of the vacuum, and assures the even distribution of atmospheric forces throughout the surface area of the blanket. It also enables the occluded or formed gases to escape from the face of the molded article instead of having to pass throughout its width or length.

It is further to be understood that an organi-silicon treated class fabric of interwoven fibers or yarns, or of intermatted on interfelted glass fibers, may be interposed between the flexible cellophane or rubber sheet 20 and the surface of the material being molded for purposes of preventing adhesion between the two and permitting air and gas to be exhausted as well as operating as a heat insulation.

It is to be understood that numerous changes may be made without departing from the spirit of this invention, especially as defined in the following claim.

I claim:

Molding equipment comprising male and female mold parts, one of said mold parts being a rigid mold form adapted to receive the material to be molded, a resilient gasket perimetrically mounted about the mold form, a deformable surface on the other mold part adapted progressively to increase the area of contact with said mold form responsive to increased pressures urging said mold parts together, an impervious sheet between said mold parts adapted to engage said resilient gasket during convergence of said mold parts, and means for exhausting the chamber formed by said gasket and said sheet causing said sheet further to force the molding material into intimate contact with the mold form.

HOWARD W. COLLINS.

REFERENCES CITED

The following references are of record in the file of this patent:

UNITED STATES PATENTS

| Number | Name | Date |
|---|---|---|
| 1,517,208 | Gillespie et al. | Nov. 25, 1924 |
| 1,578,448 | Lebby | Mar. 30, 1926 |
| 1,821,413 | Whitehouse | Sept. 1, 1931 |
| 2,353,996 | Cooke et al. | July 18, 1944 |
| 2,356,225 | Cummington | Aug. 22, 1944 |
| 2,367,779 | Hull | Jan. 23, 1945 |
| 2,377,946 | Leary | June 12, 1945 |
| 2,380,573 | Beasecker | July 31, 1945 |
| 2,408,540 | Williams | Oct. 1, 1946 |
| 2,422,979 | Pecker | June 24, 1947 |